United States Patent [19]

Kaneko et al.

[11] Patent Number: 4,702,432
[45] Date of Patent: Oct. 27, 1987

[54] SPINNING REEL BRAKE FOR FISHING

[75] Inventors: Kyoichi Kaneko; Nobuyuki Yamaguchi, both of Tokyo, Japan

[73] Assignee: Daiwa Seiko Inc., Tokyo, Japan

[21] Appl. No.: 847,713

[22] Filed: Apr. 3, 1986

[30] Foreign Application Priority Data

Apr. 19, 1985 [JP] Japan .............................. 60-58760[U]

[51] Int. Cl.⁴ ...................... A01K 89/01; A01K 89/02
[52] U.S. Cl. .............................................. 242/84.5 A
[58] Field of Search .................. 242/84.21 R, 84.5 A, 242/84.5 R, 84.51 A, 84.51 R

[56] References Cited

U.S. PATENT DOCUMENTS 2,558,896  7/1951  Young et al. ................ 242/84.51 R
2,773,655  12/1956 Mandolf .......................... 242/84.5 A
4,513,925  4/1985  Yamaguchi ..................... 242/84.5 P Primary Examiner—Billy S. Taylor
Attorney, Agent, or Firm—Browdy and Neimark

[57] ABSTRACT

A spinning reel for fishing in which a drag adjusting knob produces an increased engaging force (holding force) so that it is prevented from escaping that may be caused when it is loosened, and which makes it possible to finely and reliably control the drag that may require a weak force of control.

6 Claims, 3 Drawing Figures

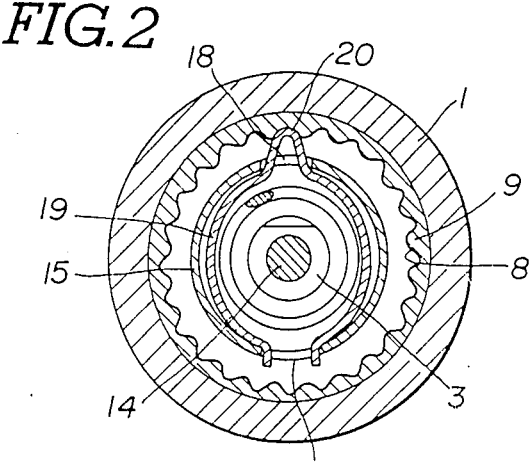
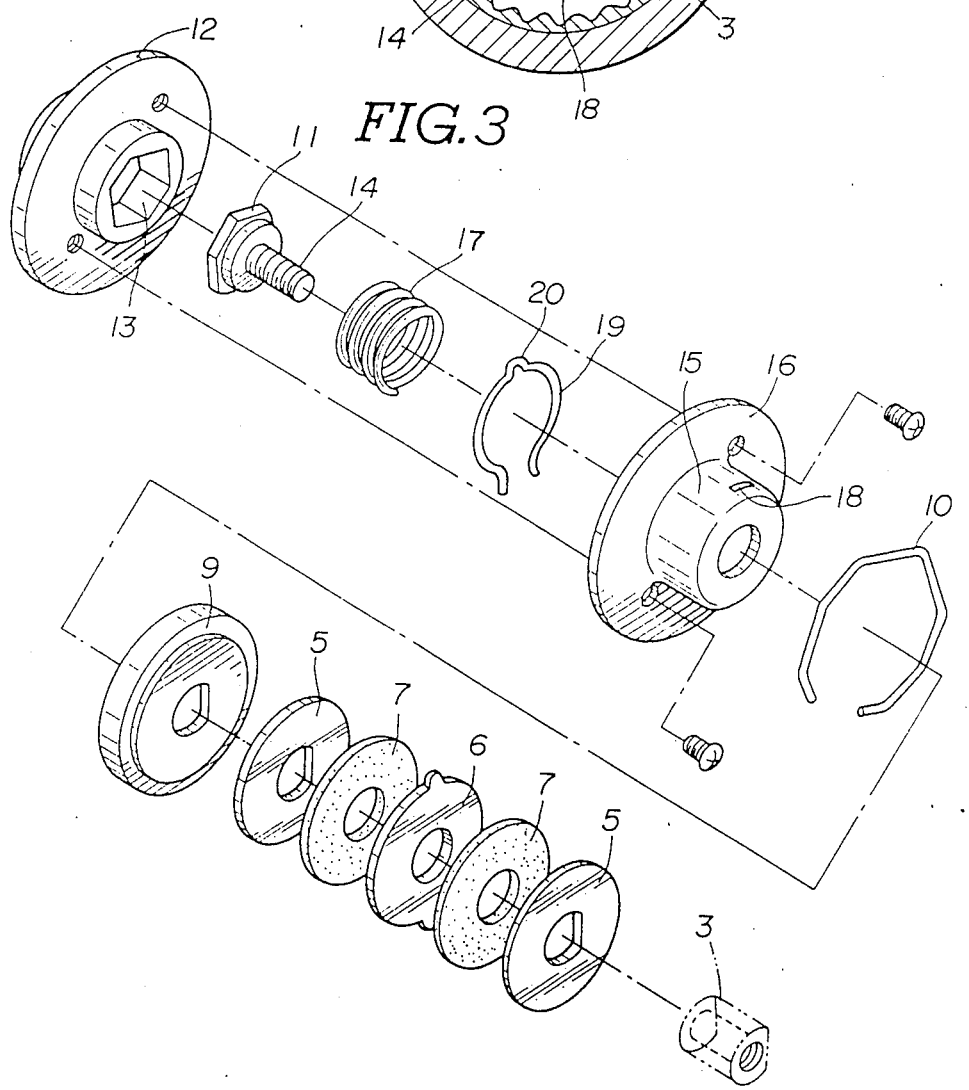

4,702,432

SPINNING REEL BRAKE FOR FISHING

BACKGROUND OF THE INVENTION

1. Field of the Invention

The present invention relates to an improved device for preventing a drag adjusting knob from loosening in a spinning reel for fishing, which reliably prevents the nob from loosening and which is compactly constructed.

2. Prior Art

Means for preventing the drag adjusting knob from loosening in a spinning reel for fishing has been disclosed in Japanese Utility Model Publication No. 58948/1982, according to which a set plate having teeth along the periphery thereof is engaged with the upper portion of a brake plate that is slidably supported by a spool shaft at a front portion thereof but without being allowed to rotate, and an engaging pawl provided on the knob is resiliently engaged with a tooth of the seat plate. When the knob is turned, the engaging pawl simply swings toward the right or left to engage with the tooth. In this case, however, the engagement is not strong due to the nature of the mechanism. In other words, the knob has a weak holding force and tends to be loosened, and the engaging pawl and the teeth lack durability, too. When the knob is turned, furthermore, sharp and vivid sound is not produced. Moreover, the knob has a shape that protrudes greatly toward the front of the spool, causing the spinning reel to become bulky.

A system has also been disclosed in Japanese Utility Model Publication No. 32290/1984, in which a ball is urged by an annular spring to engage with a gear that is fitted to a spool shaft to freely slide only in the axial direction thereof. According to this system in which the ball engages with the gear, the degree of engagement is small. Further, since the ball is brought into engagement while being rotated, the engaging force is weak, i.e., the holding force of the knob is weak like the above-mentioned device. Moreover, the annular spring, ball and gear that are arranged in the portion of the drag adjusting knob cause it to greadly protrude toward the front of the spool, i.e., make it difficult to compactly construct the device. Furthermore, to incorporate the annular spring requires cumbersome operation in manufacturing the device.

SUMMARY OF THE INVENTION

The present invention was accomplished to improve these defects, and its first feature is to provide a spinning reel for fishing in which a drag adjusting knob produces an increased engaging force (holding force) so that it is prevented from escaping as may be caused when it is loosened, and which makes it possible to finely and reliably control the drag that may require a weak force of control.

A second feature of the present invention is to provide a spinning reel for fishing, in which an annular spring is inserted in a cylinder with a bottom that is secured to a drag adjusting knob, a folded protrusion at the center of the annular spring is protruded beyond a hole formed in the cylinder with a bottom so as to engage with a tongued and grooved face formed on an inner peripheral surface of a dish member that engages with the shaft member, to thereby produce a suitable holding force in turning the drag adjusting knob.

A third feature of the present invention is to provide a spinning reel for fishing in which a threaded rod screwed into the shaft, an annular spring and a spring are contained as a unitary structure in the cylinder with a bottom which is secured to a drag adjusting knob in order to facilitate the operation for assembling and disassembling the drag mechanism, and in order to reduce the amount of protrusion of the drag adjusting knob toward the front, such that the drag mechanism can be constructed in a compact size.

BRIEF DESCRIPTION OF THE DRAWINGS

FIG. 2 is a section view along the line A—A of FIG. 1; and

FIG. 3 is a perspective view showing a major portion of the invention in a disassembled manner.

DESCRIPTION OF THE PREFERRED EMBODIMENT

Figure 1:
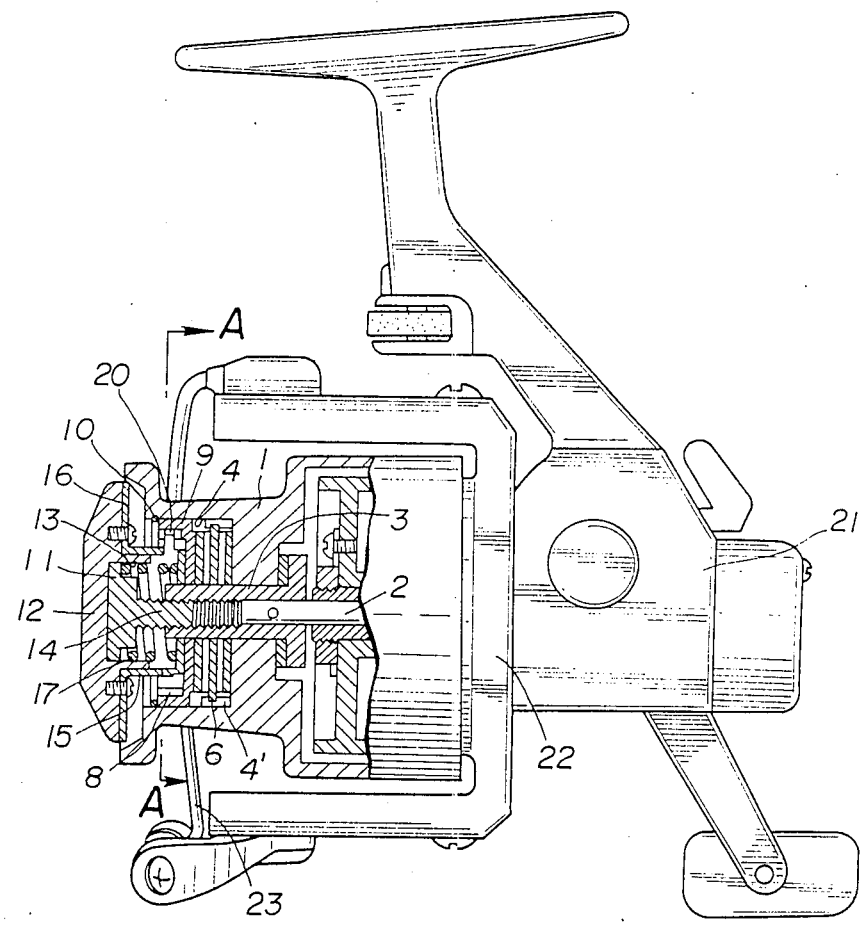
FIG. 1 is a partly cut-away front view of the present invention.

An embodiment of the present invention will now be described in conjunction with the drawings. A spool 1 of a spinning reel is rotatably fitted to a shaft 3 of a partly cut-away circular shape in cross section, which is secured to the front end of a spool shaft 2 that slides reciprocally. Widely known brake members such as washers 5 that engage with the shaft 3, a washer 6 that engages with a groove 4' of a recessed portion 4 and that is rotatable on the shaft 3, and friction plates 7 that are interposed among them, are inserted in an overlapped manner in the recessed portion 4. Further, a dish member 9 that has a tongued and grooved face 8 formed on the inner peripheral surface thereof is engaged with the shaft 3 on the front side of the forefront washer 5 being stopped by a stop ring 10 so as not to escape from the recessed portion 4 of the spool 1.

A threaded rod 14 is screwed into the end of the shaft 3, the threaded rod 14 having a polygonal junction portion 11 at its front end to engage with a junction portion 13 of a drag adjusting knob 12. To the peripheral edge of the drag adjusting knob 12 is fastened a flange plate 16 of a cylinder 15 the bottom surface of which abuts to the inner bottom surface of the dish member 9. A coil spring 17 is loaded between the inner bottom surface of the cylinder 15 with bottom and the junction portion 11 of the threaded rod 14.

Through holes 18, 18 are formed in the periphery of the cylinder 15 in an opposing manner. Ends of an annular spring 19 inserted in the cylinder 15 are fitted to one through hole 18, and a central folded protrusion 20 of the annular spring 19 is allowed to protrude beyond another through hole 18 to come into engagement with the tongued and grooved face 8 of the dish member 9.

A rotor 22 is provided at the back of the spool 1 and is turned by a handle in front of a reel housing 21. A fishing line is wound on the spool 1 by a bail arm 23 that is attached to the rotor 22 in a customary manner.

The embodiment of the present invention is constructed as described above. When the drag of the spool 1 is to be controlled, therefore, the drag adjusting knob 12 is turned to turn and feed forward the threaded rod 14 that engages with the knob 12. The cylinder 15 fastened to the threaded rod 14, then, presses the dish member 9, so that the washers 5, 6 and friction plates 7, that are brake members, are pressed together. Depending upon the degree of pressing force, the power transmission varies between the spool 1 and the shaft 3. If the threaded rod 14 is turned and retracted, the power transmission decreases between the spool 1 and the shaft 3; i.e., the braking members undergo slip. In these cases, the central folded protrusion 20 of the annular spring 19 is brought into engagement with the tongued and grooved face of the dish member 9 as the drag adjusting knob 12 is turned, whereby a holding force is given to the turning operation so that the drag adjusting knob is prevented from loosening.

According to the present invention as described above, the annular spring is inserted in the cylinder with bottom which is secured to the drag adjusting knob, a central folded protrusion of the annular spring is protruded beyond a through hole to come into engagement with the tongued and grooved face of the dish member, and the drag adjusting knob, threaded rod, annular spring and spring are assembled together as a unitary structure in the cylinder with bottom. Therefore, the central folded protrusion of the annular spring smoothly and reliably engages with the tongued and grooved face of the dish member maintaining a strong engaging force to impart a suitable holding force to the turn of the drag adjusting knob so that it is prevented from loosening. The thus constructed drag mechanism exhibits increased durability and is formed as a unitary structure, enabling the drug mechanism to be easily assembled or disassembled. Moreover, the drag adjusting knob protrudes little toward the front, and the drag mechanism can be constructed in a compact size.

What is claimed is:

1. A spinning reel for fishing comprising:
   a rotor having a bail arm, and a handle in a reel housing connected to said rotor, for rotating the rotor by turning the handle to wind up a fishing line;
   a spool having an axis for said winding of the fishing line, located in front of said rotor and having a recessed portion in a front side thereof;
   a shaft connected to said spool along said axis of winding, to move said spool back and forth with respect to said rotor; and
   a drag adjusting knob located in said front side of said spool for adjusting the drag for unwinding said fishing line from said spool; and
   means for preventing said drag adjusting knob from loosening, comprising:
   an end of said shaft being formed with a partly cut-away circular shape in cross section;
   the spool being rotatably fitted onto said end of said shaft;
   brake members for braking the spool being inserted in said recessed portion in said front side of the spool;
   a dish member of said loosening preventing means having tongued and grooved face formed on an inner peripheral surface of said dish member, said dish member being engaged with the shaft, said shaft protruding frontwardly beyond the brake members, and said dish member being movable in the axial direction of said shaft;
   said drag adjusting knob being screwed into the end of the shaft for motion in the axial direction thereof by rotation of the drag adjustment knob;
   a cylinder of said loosening preventing means with a top and a bottom being secured at said top thereof by respective fastening means to a rear surface of said drag adjusting knob, said bottom of said cylinder being contacted to a bottom surface of said dish member, and a pair of through holes being formed in the sides of the cylinder in an opposing manner; and
   an annular spring of said loosening preventing means being inserted in said cylinder with first ends fitted to one of said through holes, and a central folded protrusion of the annular spring protruding through the other through holes so as to come into engagement with the tongued and grooved face of said dish member to provide a holding force for said preventing of loosening of said drag adjustment knob.

2. The reel of claim 1, wherein
   the shaft is constituted by a spool slide shaft and a further shaft that is secured to the end of the spool slide shaft has said partly cut-away shape in cross section,
   the spool is rotatably fitted to said further shaft, and
   a coil spring is effectively loaded between the bottom of the cylinder and said drag adjusting knob to be compressed in the axial direction of said shaft.

3. The reel of claim 1, wherein said brake members and said dish member are non-rotatably provided on said shaft adjacent to each other, said cylinder is rotatably provided on said shaft, and a friction plate is rotatably provided on said shaft between each adjacent pair of said brake members.

4. The reel of claim 1, said means for preventing the loosening of said drag adjusting knob including:
   a screw rod non-rotatably extending to be screwed into said shaft for said motion in the axial direction of said shaft,
   said top of said cylinder being a flange plate connected by said fastening means to said rear surface of said drag adjusting knob, said fastening means comprising screws, and
   a coil spring retained on said screw rod in axial compression between a respective part of said screw rod and said bottom of said cylinder,
   wherein said drag adjusting knob with said screw rod, said coil spring, said annular spring and said cylinder comprise a unitary part of the reel that can be disengaged as a unit from said reel.

5. The reel of claim 4, said annular spring fitting outside said coil spring and inside said cylinder except where extending in said through holes.

6. The reel of claim 5, comprising a stop ring between said dish-shaped member and said cylinder, said stop ring fitting into a respective recess in said front side of the spool.

* * * * *